US010558734B2

(12) United States Patent
Rochelle et al.

(10) Patent No.: US 10,558,734 B2
(45) Date of Patent: Feb. 11, 2020

(54) COLLABORATIVE WORKFLOW THROUGH MESSAGING CONVERSATIONS

(71) Applicant: Google LLC, Mountain View, CA (US)

(72) Inventors: Jonathan Rochelle, Chester, NJ (US); Micah Lemonik, New York, NY (US); Farzad Khosrowshahi, Pleasantville, NY (US); John Stephen Danaher, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/964,380

(22) Filed: Apr. 27, 2018

(65) Prior Publication Data
US 2018/0285323 A1 Oct. 4, 2018

Related U.S. Application Data

(63) Continuation of application No. 15/603,033, filed on May 23, 2017, now Pat. No. 9,959,252, which is a
(Continued)

(51) Int. Cl.
G06F 15/16 (2006.01)
G06F 17/21 (2006.01)
(Continued)

(52) U.S. Cl.
CPC ........ G06F 17/212 (2013.01); G06F 3/04842 (2013.01); G06Q 10/107 (2013.01); H04L 51/00 (2013.01); H04L 51/08 (2013.01)

(58) Field of Classification Search
CPC .. G06F 17/212; G06F 3/04842; G06F 16/176; G06F 16/93; G06Q 10/107; H04L 41/00; H04L 41/08
See application file for complete search history.

(56) References Cited

U.S. PATENT DOCUMENTS 5,337,407 A * 8/1994 Bates ..................... G06Q 10/10
715/741
5,339,388 A * 8/1994 Bates .................. G06F 3/04812
715/742
(Continued)

FOREIGN PATENT DOCUMENTS

WO 0205065 A2 1/2002

OTHER PUBLICATIONS

Prosecution History from U.S. Appl. No. 11/278,347, dated Sep. 28, 2007 through Nov. 9, 2011, 233 pp.
(Continued)

Primary Examiner — Jonathan A Bui
(74) Attorney, Agent, or Firm — Shumaker & Sieffert P.A.

(57) ABSTRACT

A networked application and email application were described herein that provide for an intuitive system by which users can participate in collaborative workflow relating to a network document. In one implementation, a system includes a messaging server component to provide messaging services and an application server component to provide a networked application. The application server component interacts with the messaging server component in response to a user command to initiate collaboration on the network document. The interaction with the messaging server component includes providing a link that refers to a version of the network document as created or edited by the user.

20 Claims, 10 Drawing Sheets

Related U.S. Application Data continuation of application No. 14/658,881, filed on Mar. 16, 2015, now Pat. No. 9,684,637, which is a continuation of application No. 14/023,696, filed on Sep. 11, 2013, now Pat. No. 8,990,310, which is a continuation of application No. 13/615,852, filed on Sep. 14, 2012, now Pat. No. 8,560,613, which is a continuation of application No. 13/359,157, filed on Jan. 26, 2012, now Pat. No. 8,291,019, which is a continuation of application No. 11/278,347, filed on Mar. 31, 2006, now Pat. No. 8,108,464.

(51) Int. Cl.
*G06Q 10/10* (2012.01)
*H04L 12/58* (2006.01)
*G06F 3/0484* (2013.01)

(56) References Cited

U.S. PATENT DOCUMENTS

| | | | |
|---|---|---|---|
| 5,781,732 | A | 7/1998 | Adams |
| 5,890,177 | A * | 3/1999 | Moody ............... G06F 17/24 715/210 |
| 5,999,932 | A | 12/1999 | Paul |
| 6,088,702 | A * | 7/2000 | Plantz ................ G06F 17/24 |
| 7,328,243 | B2 | 2/2008 | Yeager et al. |
| 7,334,018 | B2 | 2/2008 | Elms |
| 7,424,676 | B1 | 9/2008 | Carlson et al. |
| 7,437,421 | B2 | 10/2008 | Bhogal et al. |
| 7,890,405 | B1 * | 2/2011 | Robb ..................... G06F 9/54 705/35 |
| 8,108,464 | B1 | 1/2012 | Rochelle et al. |
| 8,291,019 | B1 | 10/2012 | Rochelle et al. |
| 8,560,613 | B1 | 10/2013 | Rochelle et al. |
| 8,990,310 | B1 | 3/2015 | Rochelle et al. |
| 9,165,285 | B2 | 10/2015 | Schultz |
| 9,684,637 | B1 | 6/2017 | Rochelle et al. |
| 2002/0065848 | A1* | 5/2002 | Walker ................ G06F 17/24 715/205 |
| 2002/0099777 | A1* | 7/2002 | Gupta ................ G06F 17/241 709/206 |
| 2002/0158901 | A1* | 10/2002 | Mezei ................ G09B 21/001 715/744 |
| 2003/0023679 | A1 | 1/2003 | Johnson et al. |
| 2003/0070176 | A1 | 4/2003 | Parker et al. |
| 2003/0140067 | A1 | 7/2003 | Sesek et al. |
| 2003/0220795 | A1 | 11/2003 | Arayasantiparb |
| 2004/0051736 | A1 | 3/2004 | Daniell |
| 2004/0064733 | A1 | 4/2004 | Gong |
| 2004/0172450 | A1* | 9/2004 | Edelstein ............ G06Q 10/10 709/205 |
| 2004/0205664 | A1 | 10/2004 | Prendergast |
| 2004/0267871 | A1 | 12/2004 | Pratley et al. |
| 2004/0268246 | A1 | 12/2004 | Leban et al. |
| 2005/0021938 | A1 | 1/2005 | Kidokoro |
| 2005/0033622 | A1 | 2/2005 | Kuo et al. |
| 2005/0033811 | A1* | 2/2005 | Bhogal ................ G06F 17/24 709/206 |
| 2005/0091324 | A1 | 4/2005 | Flocken |
| 2005/0097061 | A1 | 5/2005 | Shapiro et al. |
| 2005/0138110 | A1 | 6/2005 | Redlich et al. |
| 2005/0193145 | A1 | 9/2005 | Brown |
| 2005/0198612 | A1 | 9/2005 | Gonzalez |
| 2005/0209914 | A1 | 9/2005 | Nguyen et al. |
| 2005/0210146 | A1 | 9/2005 | Shimizu |
| 2005/0216827 | A1 | 9/2005 | Mochizuki |
| 2005/0229258 | A1 | 10/2005 | Pigin |
| 2005/0234990 | A1 | 10/2005 | Brighouse et al. |
| 2005/0251675 | A1 | 11/2005 | Marcjan et al. |
| 2006/0020670 | A1 | 1/2006 | Anderson |
| 2006/0031495 | A1 | 2/2006 | Connors et al. |
| 2006/0069990 | A1 | 3/2006 | Yozeii-Epstein et al. |
| 2006/0075036 | A1 | 4/2006 | Malik |
| 2006/0075228 | A1 | 4/2006 | Black |
| 2006/0080432 | A1 | 4/2006 | Spataro et al. |
| 2006/0095527 | A1 | 5/2006 | Malik |
| 2006/0136511 | A1 | 6/2006 | Ngo et al. |
| 2006/0136513 | A1 | 6/2006 | Ngo et al. |
| 2006/0168044 | A1 | 7/2006 | Chen et al. |
| 2006/0195526 | A1 | 8/2006 | Lederer |
| 2006/0206500 | A1 | 9/2006 | Komamura et al. |
| 2006/0235933 | A1 | 10/2006 | Baluja et al. |
| 2006/0248129 | A1 | 11/2006 | Carnes et al. |
| 2007/0074122 | A1* | 3/2007 | Nichols ................ G06F 9/541 715/751 |
| 2007/0106729 | A1 | 5/2007 | Adams et al. |
| 2007/0130370 | A1 | 6/2007 | Akaezuwa |
| 2007/0143425 | A1 | 6/2007 | Kieselbach et al. |
| 2007/0162840 | A1 | 7/2007 | Rochelle et al. |
| 2007/0180354 | A1 | 8/2007 | Rivers-Moore |
| 2007/0198952 | A1* | 8/2007 | Pittenger ............ G06F 17/2247 715/853 |
| 2007/0208943 | A1 | 9/2007 | Gupta |
| 2007/0233459 | A1 | 10/2007 | Perronnin |
| 2008/0263101 | A1 | 10/2008 | Hara |
| 2009/0262668 | A1* | 10/2009 | Hemar ................ G06Q 30/02 370/260 |
| 2011/0019020 | A1* | 1/2011 | King ................ G06K 9/00442 348/222.1 |
| 2014/0019839 | A1 | 1/2014 | Dargahi et al. |
| 2017/0255596 | A1 | 9/2017 | Rochelle et al. |

OTHER PUBLICATIONS

Prosecution History from U.S. Appl. No. 13/359,157, dated Jan. 26, 2012 through Jun. 19, 2012, 48 pp.

Prosecution History from U.S. Appl. No. 13/615,852, dated Sep. 14, 2012 through Jun. 20, 2013, 49 pp.

Prosecution History from U.S. Appl. No. 14/023,696, dated Sep. 11, 2013 through Nov. 19, 2014, 66 pp.

Prosecution History from U.S. Appl. No. 14/658,881, dated Mar. 16, 2015 through Feb. 8, 2017, 47 pp.

Prosecution History from U.S. Appl. No. 15/603,033 dated Jun. 6, 2017 through Dec. 21, 2017, 37 pp.

* cited by examiner 115-1

To: Jack, Jill, Xavier
From: Jim
Subject: updates to project status charts

Hello everyone, please make your changes to this status chart:

http://www.onlinedoc.com/Jim/chart123.htm?version=1 ~120

115-2

To: Jim, Jill, Xavier
From: Jack
Subject: Re: updates to project status charts

I have no changes.

115-3

To: Jack, Jim, Xavier
From: Jill
Subject: Re: updates to project status charts

See my changes.

http://www.onlinedoc.com/Jim/chart123.htm?version=2 ~122

115-4

To: Jack, Jim, Jill
From: Xavier
Subject: Re: updates to project status charts

Here are my suggestions.
-Xavier http://www.onlinedoc.com/Jim/chart123.htm?version=3 ~124

115-5

To: Jack, Jill, Xavier
From: Jim
Subject: Re: Re: updates to project status charts Thanks everyone.

| | A | B | C | D | E | F | G | H |
|---|---|---|---|---|---|---|---|---|
| | | | $F_x$: = sum(D1:D3) | | | | S | |
| 1 | | | Expenses for the Trip: | $ 9.00 | | | | |
| 2 | | | | $ 11.00 | | | | |
| 3 | | | | $ 5.00 | | | | |
| 4 | D4 | | | $ 25.00 | | | | |
| 5 | | | | | | | | |
| 6 | | | | | | | | |
| 7 | | | | | | | | |
| 8 | | | | | | | | |

SHARE SPREADSHEET WITH OTHERS

SHARE WITH—
TO: Jack, Jill, Xavier
CC:
SUBJECT: updates to project status charts Hello everyone, please make your changes to this status chart:
http://www.onlinedoc.com/Jim/chart123.htm?version=1 — 725

SHARE SPREADSHEET WITH OTHERS

TO: Jack, Jill, Jim
CC:
SUBJECT: Re: updates to project status charts

Here are my suggestions.
-Xavier
http://www.onlinedoc.com/Jim/chart123.htm?version=1 — 825

COLLABORATIVE WORKFLOW THROUGH MESSAGING CONVERSATIONS

RELATED APPLICATION

This application is a continuation of U.S. application Ser. No. 15/603,033, filed May 23, 2017, which is a continuation of U.S. application Ser. No. 14/658,881, filed Mar. 16, 2015, now U.S. Pat. No. 9,684,637, which is a continuation of U.S. application Ser. No. 14/023,696 filed Sep. 11, 2013, now U.S. Pat. No. 8,990,310, which is a continuation of U.S. application Ser. No. 13/615,852, filed Sep. 14, 2012, now U.S. Pat. No. 8,560,613, which is a continuation of U.S. application Ser. No. 13/359,157, filed Jan. 26, 2012, now U.S. Pat. No. 8,291,019, which is a continuation of U.S. application Ser. No. 11/278,347, filed Mar. 31, 2006, now U.S. Pat. No. 8,108,464, the entire contents of each of which are hereby incorporated by reference.

BACKGROUND

A. Field of the Disclosure

The present disclosure relates generally to collaboration among users of a network application, and more specifically, to collaboration through email or chat programs.

B. Description of the Related Art

Existing office productivity applications, such as spreadsheet and word processor applications, tend to be software programs that execute locally on a computer system of a single user. The documents produced by such a system can be difficult to distribute and difficult to modify or collaborate on when working in a group environment.

Networked versions of these applications tend to provide a more suitable platform for collaboration among multiple users. Different ones of the users may edit and save their edits to a copy of a document at a central storage location. With such networked applications, it is desirable to provide users the ability to initiate and participate in collaborative workflow in a manner that is convenient and conceptually simply for the users.

SUMMARY

One aspect is directed to a method that includes providing a networked application to a number of users, where the networked application is configured to facilitate generation of a network document. The method further includes facilitating providing a messaging interface in response to a request from a user of the networked application to send a message relating to collaboration on the network document. Further, the method includes pre-populating the messaging interface with a subject of the message determined based on a subject of a previous message in a thread of messages sent relating to collaboration on the network document, and a link that references a version of the document as created or edited by the user.

Another aspect is directed to a system including a messaging server component to provide messaging services and an application server component. The application server component provides interacts with the messaging server component in response to a user command to initiate collaboration on a network document based on sending of a message to collaborators of the networked document. The collaborators are assigned default editing privileges for the network document based on how the user addresses the collaborators in the message. The interaction with the messaging server component includes providing a link that refers to a version of the network document as created or edited by the user.

Yet another aspect is directed to a method that includes receiving a request to initiate collaboration on a network document; providing an email interface in response to the request, the email interface including a "To:" field and a "CC:" field; and generating a group of collaborators for the network document based on user email addresses entered into the "To:" field and the "CC:" field. The group of collaborators are assigned default editing privileges by assigning collaborators addressed in the TO field as having editing privileges and assigning collaborators addressed in the CC field as being limited to viewing the networked document.

BRIEF DESCRIPTION OF THE DRAWINGS

The accompanying drawings, which are incorporated in and constitute a part of this specification, illustrate an embodiment of the invention and, together with the description, explain the invention. In the drawings, FIG. 1 is a diagram illustrating a conceptual example of collaborative workflow relating to a document;

FIG. 5 is a diagram of an exemplary interface presented to a client by the online spreadsheet application shown in FIG. 4;

FIG. 7 is a diagram of an exemplary email interface;

FIG. 8 is a diagram of another exemplary email interface;

DETAILED DESCRIPTION

Figure 2:
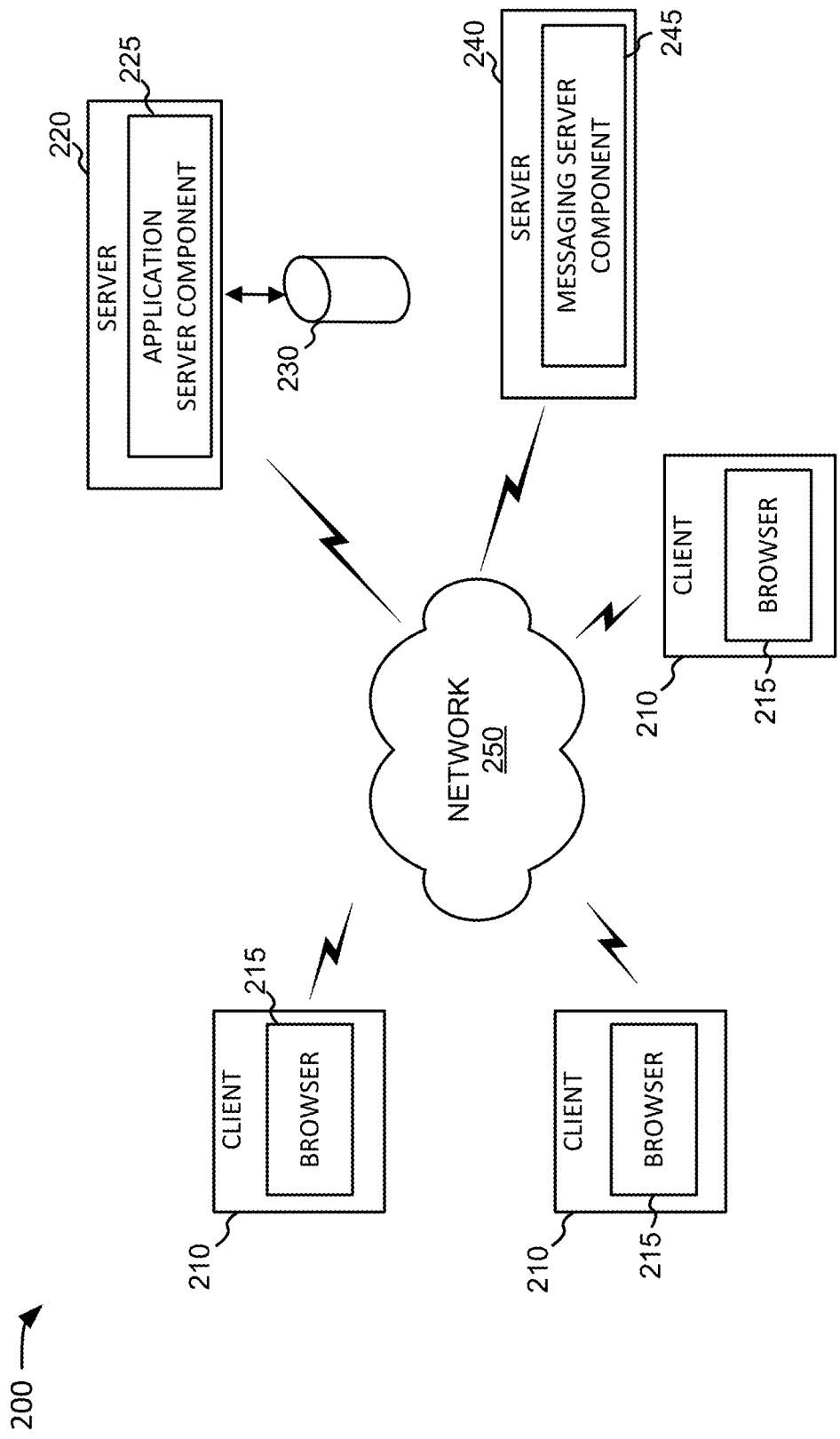
FIG. 2 is a diagram of an exemplary system in which concepts consistent with the principles of the invention may be implemented.

The following detailed description refers to the accompanying drawings. The detailed description does not limit the invention.

Overview

Implementations consistent with the principles of the invention relate to collaborative workflow in which different versions of a document are referenced within messages of a threaded email or chat system. Users of a set of threaded email or chat messages are able to quickly see the history of changes made to the collaborative document, potentially along with comments relating to changes made by the collaborators to the document.

One example of collaborative workflow relating to a document, such as a spreadsheet document organized in an email thread, is illustrated in FIG. 1. An email thread 110 is shown in FIG. 1 as an exemplary exchange of five email messages 115-1 through 115-5 between four users. The email messages may be grouped to obtain the "thread" of email messages shown in FIG. 1 by an email client designed to group and display related emails together. An example of such an email client is the known Gmail client, from Google Incorporated, which keeps track of individual threads or "conversations" (an original message, along with all the replies to that message), and allows users to view the emails related to a specific conversation.

In the example shown of FIG. 1, email 115-1 is the initial email requesting that recipients of the email make changes to a collaborative document that is referenced by a link 120 in email 115-1. The recipients of email 115-1 may click on link 120 to open an editable version of the document. In this example, all three of the recipients of email 115-1 (Jack, Jill, and Xavier) responded to email 115-1. Jack responded (email 115-2) to say that he had no changes. Jill responded (email 115-3) and noted that she made some changes to the document. The version of the document that includes Jill's changes is referenced by link 122 of Jill's email. Xavier responded (email 115-4) and noted that he also made some changes to the document. The version of the document that includes Xavier's changes is referenced by link 124 of email 115-4.

The four correspondents associated with thread 110 (i.e., Jim, Jack, Jill, and Xavier) can conveniently view email thread 110. Consistent with an aspect of the invention, Jim, for example, may easily view the different versions of the edited document by respectively clicking on links 120, 122, and 124. In some implementations, Jim may be able to easily accept or reject the different changes made by Jill and Xavier. Because most people use an email application, providing for collaborative workflow via email thread 110 gives users the ability to easily and intuitively initiate and participate in collaborative workflow.

System Description

FIG. 2 is a diagram of an exemplary system 200 in which concepts consistent with the principles of the invention may be implemented. System 200 may include multiple clients 210 that can connect to servers, such as servers 220 and 240, via a network 250. Network 250 may include a local area network (LAN), a wide area network (WAN), a telephone network, such as the Public Switched Telephone Network (PSTN), an intranet, the Internet, or a combination of networks. Two clients 210 and two servers 220 and 240 are illustrated as connected to network 250 for simplicity. In practice, there may be more clients and/or servers. Also, in some instances, a client may perform one or more functions of a server and a server may perform one or more functions of a client.

A client 210 may include a device, such as a personal computer, a lap top computer, a wireless telephone, a personal digital assistant (PDA), or another type of computation or communication device. Users of clients 210 may access or receive information from servers 220 and 240.

Server 220 may generally interact with clients 210 such that clients 210, in conjunction with server 220, interact with a network-based application, such as a network spreadsheet or word processing application. Server 220 may include software, labeled as application server component 225, to assist in implementing the network application. Documents created by users of clients 210 may be stored by server 220 in, for example, storage media such as database 230. Although illustrated as a single device in FIG. 2, server 220 may be implemented as, for example, a single computing device or as multiple distributed computing devices. One of ordinary skill in the art will appreciate that whether a device is functioning as a server or a client often depends on the specific application being implemented. That is, whether a computing device is operating as a client or a server may depend on the context of the role of the computing device within the application. The relationship of client and server arises by virtue of computer programs running on the respective computers and having a client-server relationship to each other.

Server 240 may generally interact with clients 210 to assist clients 210 in sending and receiving email. Clients 210 may, for example, connect to server 240 via web browsers 215 or via separate email client programs (not shown) to upload emails to server 240 that are to be sent to other users or to download received emails. Server 240 may include software, labeled as email server component 245, that provides the functionality for server 240 to act as an email server. In alternative implementations, server 220 may function as an Instant Message (IM) server, or as another type of messaging platform. Server 240, although illustrated as a single device, may be implemented as, for example, a single computing device or as multiple distributed computing devices.

The interaction of clients 210 with servers 220 or 240 may be through browser programs 215 at clients 210. For example, the networked application implemented by application server component 225 may be an online spreadsheet application that functions as a web application that runs within browsers 215. In this manner, clients 210 may not be required to install any spreadsheet specific software to use the online spreadsheet at client 210. Browser programs are well known and are widely available in the art. When browsers or browser programs are discussed herein, these terms are intended to refer to any program that allows a user to browse markup documents (e.g., web documents), regardless of whether the browser program is a stand alone program or an embedded program, such as a browser program included as part of an operating system.

Exemplary Computing Device Architecture

Figure 3:
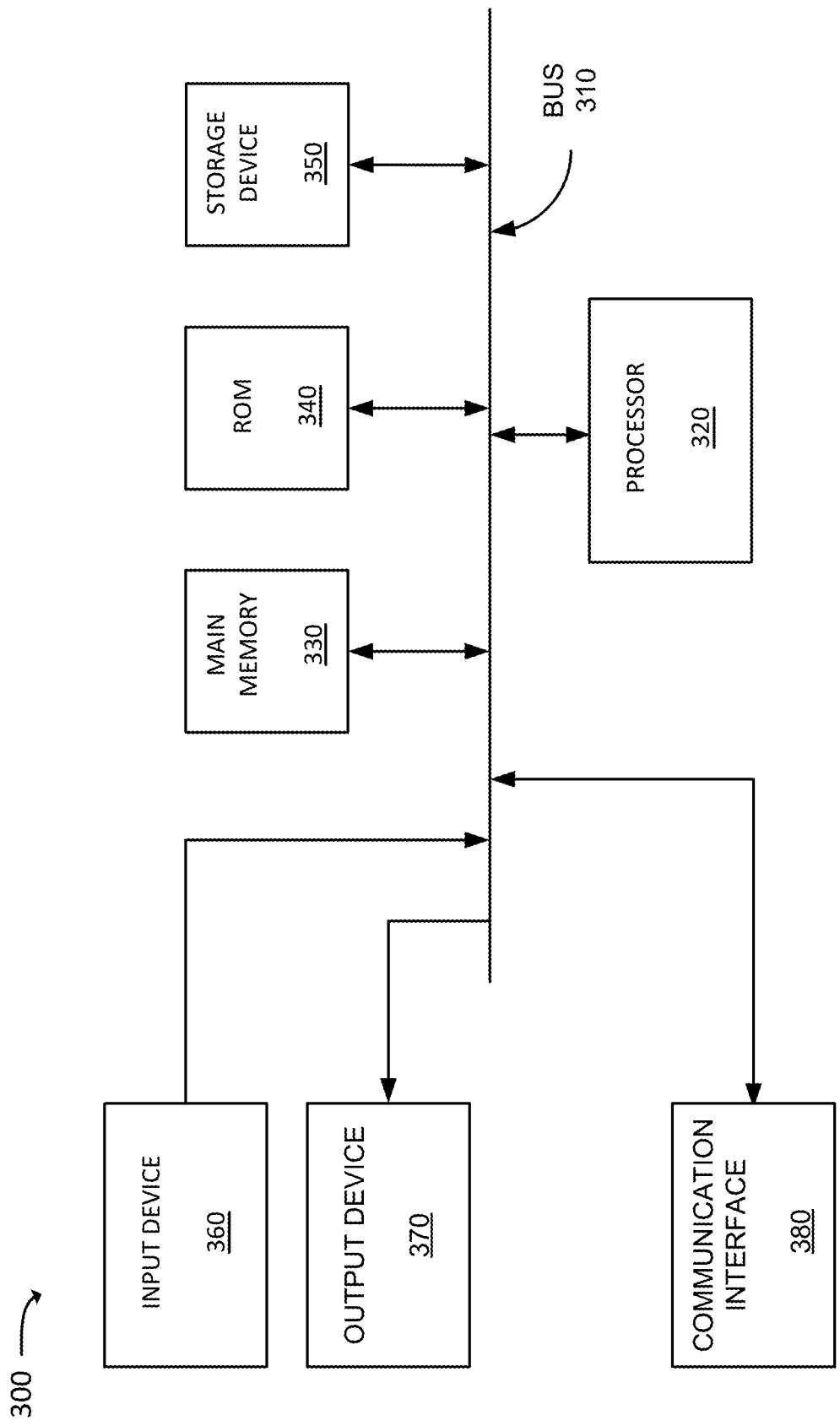
FIG. 3 is a diagram of an exemplary computing device, such as one of the computing devices shown in FIG. 2.

FIG. 3 is an exemplary diagram of computing device 300, such as one of clients 210, server 220, or server 240. Computing device 300 may include a bus 310, a processor 320, a main memory 330, a read only memory (ROM) 340, a storage device 350, an input device 360, an output device 370, and a communication interface 380. Bus 310 may include a path that permits communication among the components of computing device 300.

Processor 320 may include any type of processor, microprocessor, or processing logic that interprets and executes instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits a user to input information to computing device 300, such as a keyboard, a mouse, a pen, voice recognition and/or biometric mechanisms, etc. Output device 370 may include a conventional mechanism that outputs information to the user, including a display, a printer, a speaker, etc. Communication interface 380 may include any transceiver-like mechanism that enables computing device 300 to communicate with other devices and/or systems. For example, communication interface 380 may include mechanisms for communicating with another device or system via a network, such as network 250.

Application server component 225 and email server component 245 may be implemented in software and stored in a computer-readable medium, such as memory 330. A computer-readable medium may be defined as one or more physical or logical memory devices and/or carrier waves.

The software instructions defining application server component 225 and email server component 245 may be read into memory 330 from another computer-readable medium, such as data storage device 350, or from another device via communication interface 380. The software instructions contained in memory 330 cause processor 320 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Application Server Component 225

As previously mentioned, application server component 225 can enable clients 210 to use a networked application, such as an online spreadsheet application, an online word processor application, or another type of online application. Before describing operations consistent with aspects of the invention relating to collaborative workflow in additional detail, it will be helpful to describe an example networked application implemented by application server component 225. Application server component 225 will particularly be described as implementing an online spreadsheet application, although application server component 225 can more generally be used to implement any networked application that allows collaboration among multiple users.

The online spreadsheet application may be implemented as a distributed web application in which portions of the application execute at one or more of clients 210 and at server 220. More specifically, clients 210 that wish to use the online spreadsheet application may request the spreadsheet application from server 220. In response, server 220 may transmit portions of the spreadsheet application to clients 210 for local execution at clients 210. The online spreadsheet application may thus execute as a distributed application across server 220 and one or more of clients 210.

Figure 4:
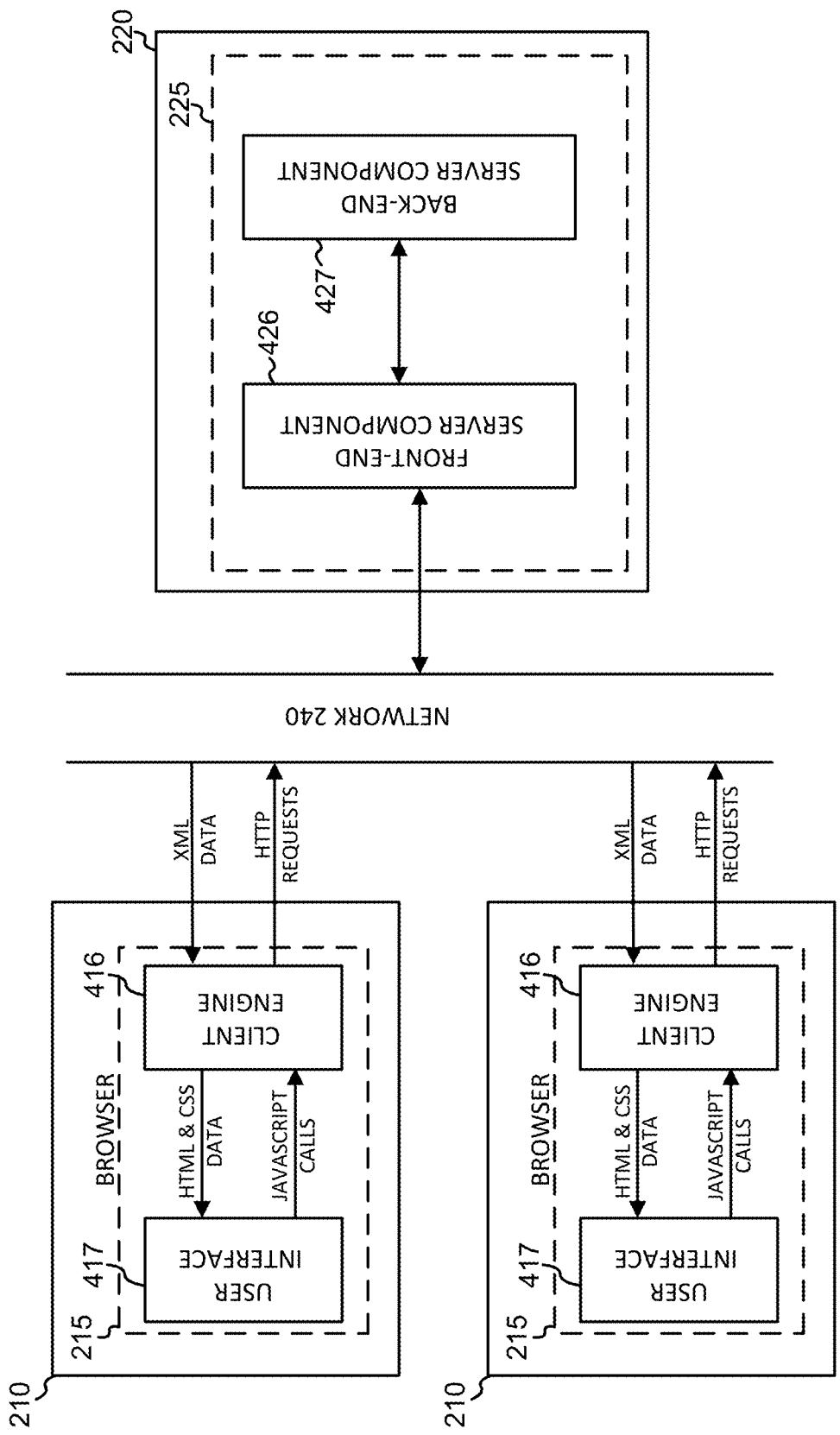
FIG. 4 is a diagram illustrating an exemplary implementation of an online spreadsheet application.

FIG. 4 is a diagram illustrating an exemplary implementation of the online spreadsheet application in additional detail. Application server component 225 may include a front-end component 426 and a back-end component 427. Front-end component 426 may include a web and/or XML server that interfaces with clients 210. For example, front-end component 426 may receive HTTP requests from clients 210 and transmit XML data to clients 210. Back-end component 427 may perform the more substantive processing related to the spreadsheet application, such as the calculation of functions required to update a spreadsheet.

Portions of the online spreadsheet application may also execute within clients 210. For example, within browser 215, the online spreadsheet application may be conceptualized as including a client engine 416 and a user interface 417. Client engine 416 may be implemented using, for example, Javascript that is downloaded from server 220 when needed by client 210. User interface 417 may provide the final user interface that is displayed in browser 215 based on, for example, HTML (hyper-text markup language) and CSS (cascading style sheets) data supplied from client engine 416.

User interface 417 and client engine 416 together act to reduce the start-stop start-stop nature of traditional browser-based web applications, as client engine 416 adds a client-side layer that can handle many of the user interactions with user interface 417. Instead of loading a web page at the start of a user session, browser 215 may load client engine 416 from server 220 (or, alternatively, from a local cache). Client engine 416 may be responsible for both rendering the interface the user sees and communicating with server 220 on the user's behalf. Client engine 416 allows the user's interaction with the online spreadsheet application to happen asynchronously, i.e., independent of communication with server 220.

In one implementation, the client-side operation of the online spreadsheet application may be implemented using the known Asynchronous JavaScript And XML (AJAX) web development techniques, although one of ordinary skill in the art will recognize that other technologies could be used.

Figure 5:
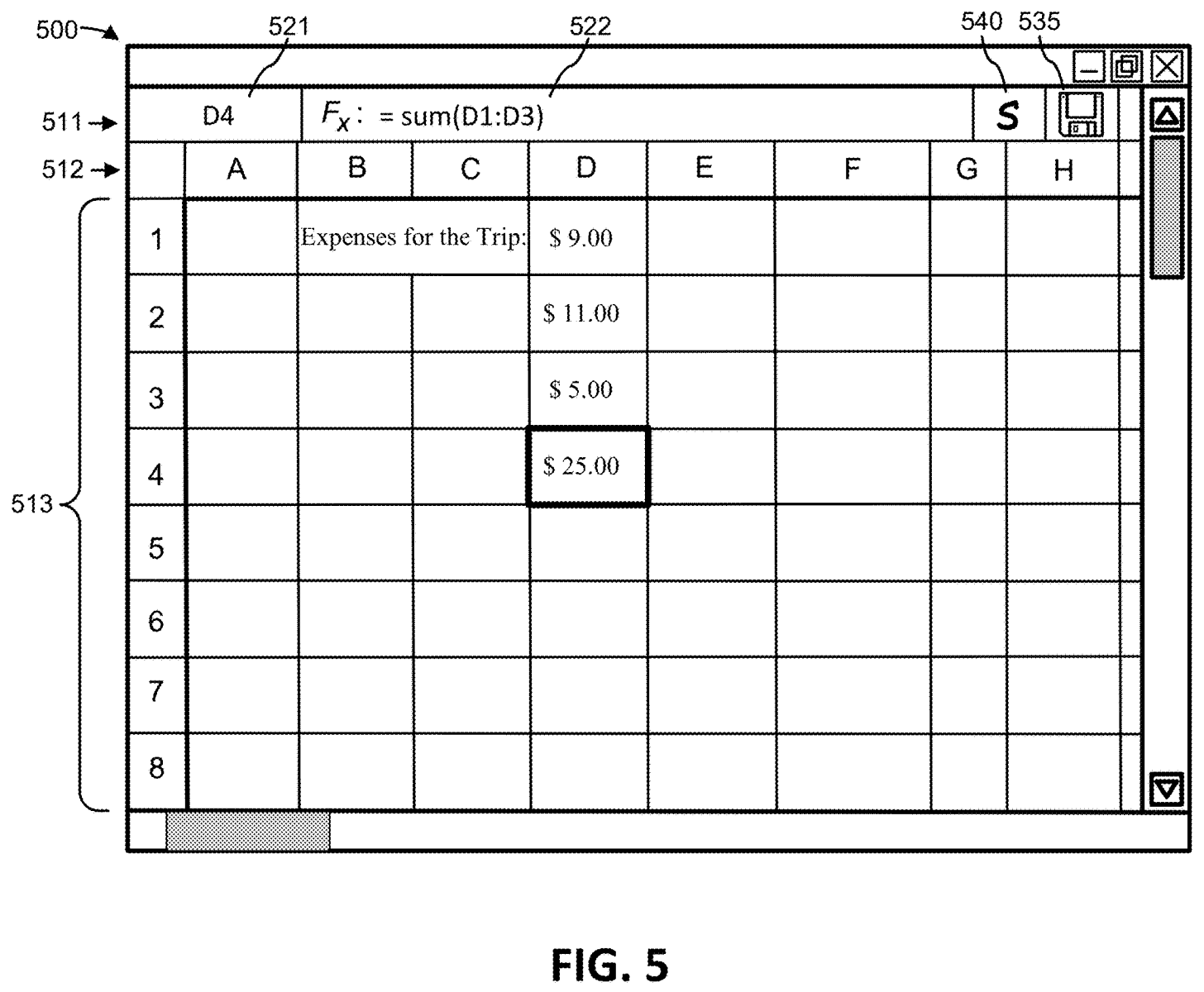

FIG. 5 is a diagram of an exemplary interface 500 presented to a client by an online spreadsheet application. Interface 500 may be shown within browser 215 of a client 210. Interface 500 may include a control row 511, a column heading row 512, and a number of data rows 513 labeled one through eight. Control row 511 may include a field 521 that displays the currently active cell (e.g., cell D4 in the example shown in FIG. 5) and a formula field 522 in which the user may enter formulas or other spreadsheet operations. Column heading row 511 includes the column headings labeled "A" through "H". Users can specify a particular cell in interface 500 by a combination of a column heading and a row heading. Cell D1, for example, includes the value "$9.00".

Through interface 500, a user can, for example, enter values or formulas into the spreadsheet cells and perform formatting operations relating to the spreadsheet. In response, client engine 416 interacts with and makes requests of application server component 225 as necessary. As shown in FIG. 5, a user has entered the text "Expenses for the Trip:" into cell B1 and entered dollar values into cells D1, D2, and D3. Cell D4 is currently the active cell (shown by the bold lines surrounding this cell). The user has entered the formula "=sum(D1:D3)," which is shown in formula field 522, and which directs the spreadsheet to sum the values in cells D1 through D3 and to write the result into cell D4. Further, as is also shown in FIG. 5, the user has modified the width of columns "F" and "G." The user may do this by, for example, dragging the column separation line between columns "F" and "G" in the desired direction.

Interface 500 may also provide other commands relating to the spreadsheet document. Interface 500 may include a "save" button 535 and a "share" button 540. Selecting save button 535 may cause the spreadsheet document to be saved to database 130. The spreadsheet document may thus be accessible by the user (or by other users) from any computing device connected to network 250. Database 130 may store multiple versions of the spreadsheet document. In this manner, the user may be able to view the spreadsheet document at different save points in the development of the document.

Share button 540 may provide an interface through which a user, such as a creator of the spreadsheet document, can share the spreadsheet document with other collaborators. Functionality associated with share button 540 consistent with an aspect of the invention, in which a user can initiate collaborative workflow through a threaded messaging application, will be described in more detail below.

The online spreadsheet application may provide for collaboration among multiple users working on a single spreadsheet. For example, multiple users may simultaneously edit a spreadsheet and view the edits of each of the users. When one user edits a particular cell of the spreadsheet, the edit may be transmitted to application server component 225 and then forwarded to other collaborating users that are also editing or viewing the spreadsheet. In this manner, multiple users may collaborate, potentially in real-time (or in near real-time), on a single spreadsheet. When performing real-time collaboration between multiple users, the online spreadsheet application may implement a conflict resolution scheme to handle situations in which different users attempt to simultaneously modify a spreadsheet cell. For example, the online spreadsheet application may give priority to certain users when deciding conflicts or the online spreadsheet application may lock a cell whenever a collaborator begins to edit the cell.

In one implementation, the parties that may view and collaborate on a particular spreadsheet application may be specified. For example, different users may be given privileges to do one or more of the following: edit the spreadsheet, view the spreadsheet only, edit designated parts of the spreadsheet, or add additional users to the list of possible collaborators. Certain users may be able to edit certain parts of the spreadsheet, while other designated cells or regions of cells will remain "locked" to those users such that the users can view but not edit the locked cells.

In some implementations, users may be able to configure the presentation of interface 500 to in some manner illustrate which users have made which edits. For example, changes made by different users may be shown in a different font or different color for each user. Alternatively or additionally, when a user mouses over or in some way selects a cell, an indication of the collaborator who last edited the cell may be shown.

The above-described functions and operations that are allowable by the online spreadsheet application are exemplary. Through spreadsheet interface 500, the online spreadsheet application may permit a user to perform numerous operations that are generally recognized as being consistent with a spreadsheet application.

Collaborative Workflow

Consistent with an aspect of the invention, application server component 225 and email server component 245 may interact with one another to implement collaborative workflow through threaded email or chat messages.

Figure 6:
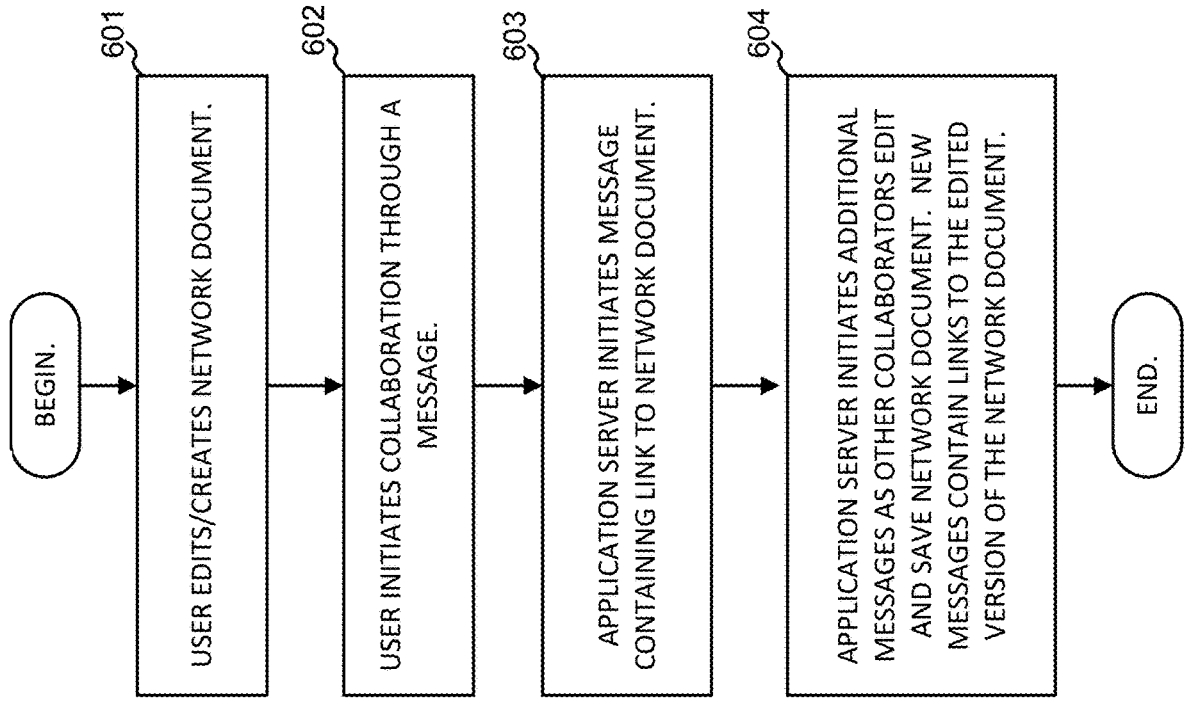
FIG. 6 is a flow chart illustrating exemplary operations for implementing collaborative workflow through threaded email messages.

FIG. 6 is a flow chart illustrating exemplary operations for implementing collaborative workflow through threaded email messages. A user may begin by creating or editing a network document, such as a network spreadsheet document, using application server component 225 (act 601).

At some point the user may wish to make the network document available to other collaborating users. The user may initiate collaboration through an appropriate command in the network application, such as a command that initiates collaboration through a message, such as an email message (act 602). In the exemplary spreadsheet interface 500, for example, the user may select share button 540 to initiate collaboration. In response, application server component 225 may contact email server component 245 and initiate an email message on the users behalf that contains a link to the network document (act 603). In one implementation, the user may have previously registered with application server component 225 to provide the user's email account information (e.g., email provider, login name, etc.) to application server component 225. In other implementations, application server component 225 and email server component 245 may be integrated in some manner, such as by both being part of a single "office suite" of applications or by being integrated by virtue of the control of both being with the same party.

FIG. 7 is a diagram of an exemplary email interface 700 that application server component 225 may present to a user when sending an email in response to the user selecting share button 540. Email interface 700 may be presented to the user as, for example, a pop-up window or a sidebar in spreadsheet interface 500. In some implementations, interface 700 may be generated by email server component 245 on behalf of, or in response to a signal from, application server component 225. As shown, the exemplary email interface 700 may include a recipient section 710 and a message section 720. In recipient section 710, the user may enter the intended collaborators of the spreadsheet, such as by entering the email addresses of the collaborators. In some implementations, the user may also be able to configure the permissions that are granted to each of the collaborators. For example, some of the collaborators may be granted permission to edit the spreadsheet while other of the collaborators may be limited to viewing the spreadsheet. In one possible implementation, the recipients in the "TO:" field may be initially granted full editing privileges while the recipients in the "CC:" or "BCC:" field may be initially granted only viewing privileges. The user, if desired, may modify these initially granted privileges.

In message section 720, the user may enter a message that is to be sent to the recipients with the email. Message section 720 may be pre-populated by application server component 225 with a link 725 that references the current version of the spreadsheet (i.e., the version of the spreadsheet that is being emailed). Link 725 will be mailed to the collaborators and can be clicked on by the collaborators to open a copy of the spreadsheet document at client 210 associated with the clicking recipient. Link 725 may include a uniform resource locator (URL) that refers to application server component 225 on server 220 and includes a string identifying the current version of the spreadsheet.

As other collaborators edit and save changes to the spreadsheet document, they may send a new message from application server component 225 using share button 540 (act 604). Each new message may be sent in the manner described above with reference to the email sent using email interface 700. More particularly, FIG. 8 is a diagram of an exemplary email interface 800 that application server component 225 may present to a user that has edited the collaborative document.

Email interface 800 is similar to email interface 700, except in FIG. 8, the sender (Xavier) has edited the spreadsheet and is sending a link 825 to each of the collaborators. Link 825, as with link 725, may have been assigned by application server component 225. Link 825 may reference a different version of the spreadsheet document than link 725 (i.e., the version of the spreadsheet document as edited by Xavier). A user opening the spreadsheet document by selecting link 825 may thus view a different version of the spreadsheet document than if the spreadsheet document was opened by selecting link 825. Application server component 225 may pre-populate various fields in the email interface based on the content of previous collaboration related messages for the application. For example, the "Subject:" field and the "To:" field may be pre-populated based on the subject and based on the previous recipients of the email message, respectively. The pre-populated data may correspond to data pre-populated by a conventional email system in replying to a message.

In some implementations, instead of initiating a message via share button 540, users may send a message regarding document collaboration through email server component 245, such as by replying to a previous message relating to device collaboration. For example, the message shown in FIG. 8 (i.e., email message 115-4 in FIG. 1) may have been initiated by the sender (Xavier) replying to the message shown in FIG. 7 (i.e., email message 115-1 in FIG. 1) via email server component 245. Email server component 245 may set link 825 either by contacting application server component 225 or by the sender directly pasting or typing link 825.

Exemplary Series of Workflow Emails

Collaborative workflow using a threaded email application will next be described with reference to FIGS. 9A and 9B.

Figure 9A:
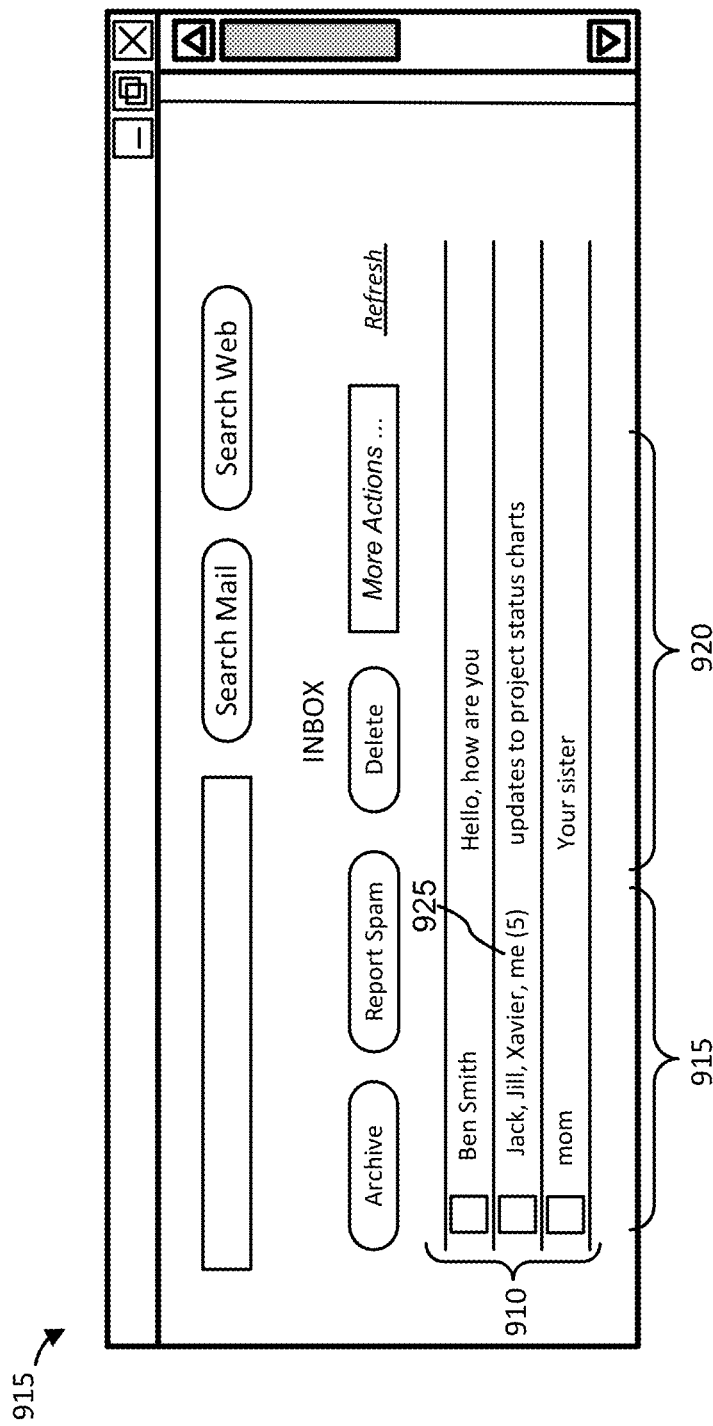
FIGS. 9A, 9B, and 9C are diagrams illustrating additional exemplary email interfaces.

FIG. 9A is a diagram illustrating an exemplary email interface 900 of an email application, such as an email application provided by email server component 245. Email server component 245 may group related messages into threads (conversations). Email server component 245 may determine when different messages are related based on, for example, common or similar message text, recipients, and/or subject header text. As shown in FIG. 9A, email interface 900 may include a list of messages 910 that are currently in the "inbox" of the user. Each item in list 910 may be displayed as a "From:" field 915 and a "Subject:" field 920. In this example, the second message, message 925, in list of messages 910 represents a thread of messages. This is illustrated in email interface 900 by the list of senders ("Jack, Jill, Xavier, me") associated with message 925 and by the number in parenthesis ("(5)") after the list of senders, which indicates the number of messages in the thread.

When a user selects threaded message 925, such as by selecting the message via a mouse click, the email application may show a more detailed view of the message thread. FIG. 9B is a diagram illustrating an exemplary email interface 940 illustrating five email messages in message thread 925. Message thread 925 is similar to the series of messages shown in FIG. 1. As shown in FIG. 9B, however, the user has chosen to minimize the view of messages 115-1 and 115-2. In this example, the user may toggle between a minimized view of a message and a "normal" view of the message by selecting the header portion of the message with a pointing device.

As previously mentioned, selecting one of links 122 or 124 may open the network document corresponding to the link. In this example, multiple versions of a spreadsheet application may be stored by application server component 225. Selecting a link 122 or 124 may cause browser 215 to contact application server 225 and initiate an instance of the network spreadsheet application. Application server component 225 may determine the particular version of the spreadsheet based on the content of the link. In this example, the text "chart123.htm?version=2" refers to the spreadsheet document saved by Jill and the text "chart123.htm?version=3" refers to the spreadsheet document saved by Xavier.

Figure 9B:
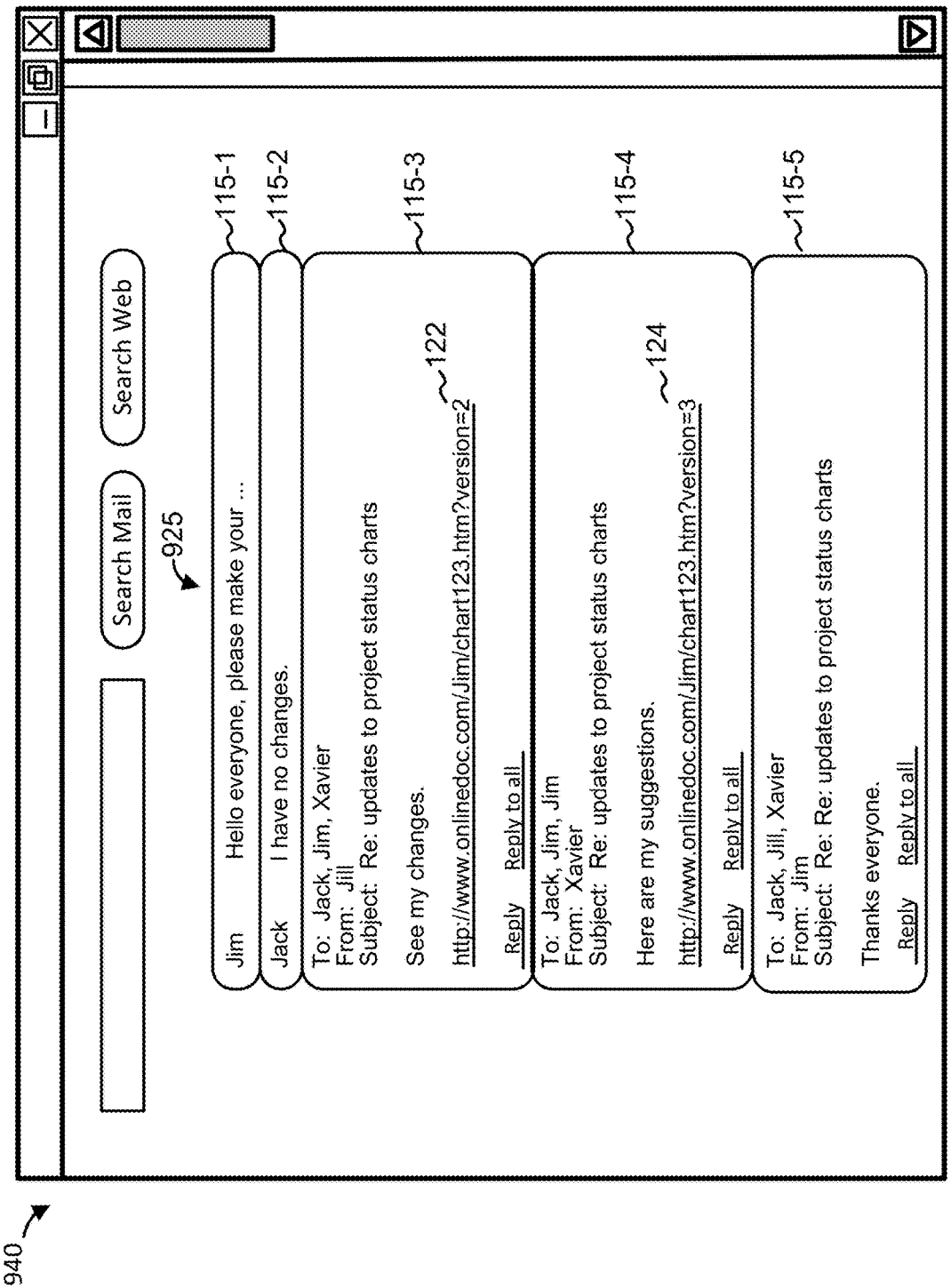
Figure 9C:
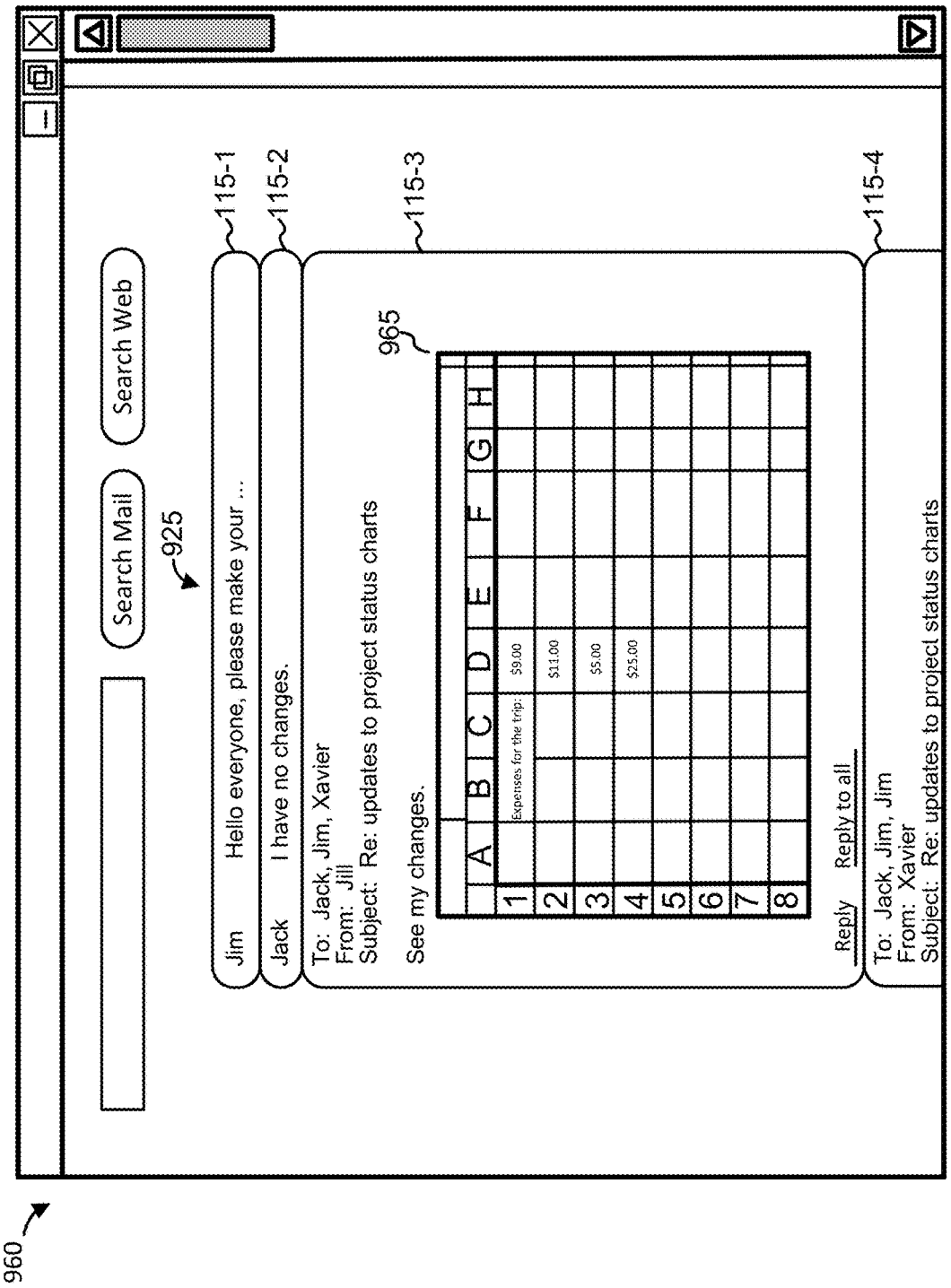

FIG. 9C is a diagram illustrating an exemplary email interface 960 illustrating email messages in message thread 925. In this implementation, some or all of the spreadsheet document may, instead of being presented as a selectable "link," may be shown as an inline (e.g., an embedded) version of the spreadsheet document. In other words, the online application may be implemented within the email application. In implementations in which the email application executes within a browser program, the online application may execute within a frame or other section of the email application. In exemplary interface 960, email 115-3 is shown as including a section 965 that includes an embedded version of the spreadsheet document. In some implementations, whether to show the spreadsheet document as a selectable link or as an embedded version of the document may be a user-settable option.

Through the email application illustrated in FIGS. 9A, 9B, and 9C, and through a networked application, such as one from application server component 225, a user can easily initiate and participate in collaborative workflow. All participants in the collaborative workflow can easily view and open older versions of the network document being collaborated upon. Additionally, application server component 225 may include functionality that allows a user, such as the initial creator of the network document, to automatically integrate changes made in selected versions of the network document into a single "master" or "final" document.

Although the collaborative workflow described above was primarily described in the context of a networked application and an email application, the concepts described above may also be applicable to other types of messaging systems, such as an instant message (IM) chat system.

CONCLUSION

A networked application and email application were described herein that provide for an intuitive system by which users can participate in collaborative workflow relating to a network document.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while the computer systems described herein was described as being used to implement an online spreadsheet, they could also be used to create other collaborative documents, such as a wiki or table.

Moreover, while series of acts have been described with regard to FIG. 6, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or a "component" that performs one or more functions. This logic may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
   storing, by a server computing system, a network document;
   responsive to receiving a request to share the network document with a group of users, creating, by the server computing system, a link that references the network document;
   assigning, by the server computing system and to each user of the group of users, at least one privilege associated with the network document, wherein the at least one privilege includes one or more of an editing privilege or a view-only privilege associated with the network document;
   outputting, by the server computing system and to a group of client computing devices associated with the group of users, a first message, wherein the first message includes the link referencing the network document, and wherein the network document is accessible via the link according to the respective at least one privilege assigned to each user of the group of users;
   receiving, by the server computing system and from a client computing device of the group of client computing devices, an indication of a selection of the link referencing the network document, wherein the client computing device is associated with a user of the group of users;
   transmitting, by the server computing system and to the client computing device, at least a portion of a network application, wherein the respective at least one privilege assigned to the user associated with the client computing device includes the editing privilege for the network document, and wherein the client computing device is configured to execute the network application to create one or more modifications to the network document;
   after receiving the indication of the selection of the link, receiving, by the server computing system and from the client computing device, the one or more modifications to the network document;
   updating, by the server computing system and based on the one or more modifications, the network document; and
   outputting, by the server computing system and to the group of client computing devices, a second message, wherein the second message includes an indication of the one or more modifications.

2. The method of claim 1, wherein receiving the request to share the network document with the group of users comprises receiving, by the server computing system, a group of email addresses with which to share the network document, wherein the group of email addresses are associated with the group of users.

3. The method of claim 1, wherein receiving the request to share the network document with the group of users comprises receiving, by the server computing system, an indication of a selection of a graphical button to share the network document with the group of users.

4. The method of claim 1, further comprising:
   responsive to receiving the indication of the selection of the link, outputting, by the server computing system and to the client computing device, the network document.

5. The method of claim 4, further comprising:
   receiving, by the server computing system and from the client computing device, an indication of a selection of a portion of the network document; and
   outputting, by the server computing system and to the client computing device, an indication of which one of the group of users last edited the portion of the network document.

6. The method of claim 1,
   wherein transmitting, by the server computing system and to the client computing device, at least the portion of the network application occurs responsive to the server computing system receiving the indication of the selection of the link from the client computing device.

7. The method of claim 1, wherein the network application comprises a spreadsheet application.

8. The method of claim 1, wherein the link referencing the network document comprises a Uniform Resource Locator (URL) that includes an indication of the network application.

9. The method of claim 1, further comprising:
   preventing, by the server computing system, at least one client computing device included in the group of client computing devices from modifying the network document, wherein the at least one client computing device is associated with at least one user included in the group of users is assigned to the view-only privilege associated with the network document.

10. The method of claim 1, wherein the one or more modifications comprise a first modification, wherein the user comprises a first user, and wherein the method further comprises:
    receiving, by the server computing system and from a second client computing device of the group of client computing devices, a second modification to the network document, wherein the second client computing device is associated with a second user of the group of users; and
    responsive to receiving an indication of a further selection of the link by at least one of the group of client computing devices, outputting, by the server computing system and to the at least one of the group of client computing devices, the first modification to the network document in a first color and the second modification to the network document in a second color.

11. A server computing system, comprising:
    one or more processors; and
    a non-transitory computer-readable medium storing one or more instructions that, when executed, cause the one or more processors to:
      store a network document;
      responsive to receiving a request to share the network document with a group of users, create a link that references the network document;
      assign, to each user of the group of users, at least one privilege associated with the network document, wherein the at least one privilege includes one or more of an editing privilege or a view-only privilege associated with the network document;

output, to a group of client computing devices associated with the group of users, a first message, wherein the first message includes the link referencing the network document, and wherein the network document is accessible via the link according to the respective at least one privilege assigned to each user of the group of users;

receive, from a client computing device of the group of client computing devices, an indication of a selection of the link referencing the network document, wherein the client computing device is associated with a user of the group of users;

transmit, to the client computing device, at least a portion of a network application, wherein the respective at least one privilege assigned to the user associated with the client computing device includes the editing privilege for the network document, and wherein the client computing device is configured to execute the network application to create one or more modifications to the network document;

after receiving the indication of the selection of the link, receive, from the client computing device, the one or more modifications to the network document;

update, based on the one or more modifications, the network document; and output, to the group of client computing devices, a second message, wherein the second message includes an indication of the one or more modifications.

12. The server computing system of claim 11, wherein the one or more instructions stored on the non-transitory computer-readable medium that cause the one or more processors to receive the request to share the network document with the group of users cause the one or more processors to receive a group of email addresses with which to share the network document, wherein the group of email addresses are associated with the group of users.

13. The server computing system of claim 11, wherein the one or more instructions stored on the non-transitory computer-readable medium further cause the one or more processors to:

responsive to receiving the indication of the selection of the link, output, to the client computing device, the network document.

14. The server computing system of claim 13, wherein the one or more instructions stored on the non-transitory computer-readable medium further cause the one or more processors to:

receive, from the client computing device, an indication of a selection of a portion of the network document; and output, to the client computing device, an indication of which one of the group of users last edited the portion of the network document.

15. The server computing system of claim 11, wherein the one or more instructions stored on the non-transitory computer-readable medium further cause the one or more processors to:

prevent at least one client computing device included in the group of client computing devices from modifying the network document, wherein the at least one client computing device is associated with at least one user included in the group of users is assigned to the view-only privilege associated with the network document.

16. A non-transitory computer-readable medium storing one or more instructions that, when executed, cause at least one processor to:

store a network document;

responsive to receiving a request to share the network document with a group of users, create a link that references the network document;

assign, to each user of the group of users, at least one privilege associated with the network document, wherein the at least one privilege includes one or more of an editing privilege or a view-only privilege associated with the network document;

output, to a group of client computing devices associated with the group of users, a first message, wherein the first message includes the link referencing the network document, and wherein the network document is accessible via the link according to the respective at least one privilege assigned to each user of the group of users;

receive, from a client computing device of the group of client computing devices, an indication of a selection of the link referencing the network document, wherein the client computing device is associated with a user of the group of users;

transmit, to the client computing device, at least a portion of a network application, wherein the respective at least one privilege assigned to the user associated with the client computing device includes the editing privilege for the network document, and wherein the client computing device is configured to execute the network application to create one or more modifications to the network document;

after receiving the indication of the selection of the link, receive, from the client computing device, the one or more modifications to the network document;

update, based on the one or more modifications, the network document; and output, to the group of client computing devices, a second message, wherein the second message includes an indication of the one or more modifications.

17. The non-transitory computer-readable medium of claim 16, wherein the one or more instructions that cause the at least one processor to receive the request to share the network document with the group of users cause the at least one processor to receive a group of email addresses with which to share the network document, wherein the group of email addresses are associated with the group of users.

18. The non-transitory computer-readable medium of claim 16, wherein the one or more instructions further cause the at least one processor to:

responsive to receiving the indication of the selection of the link, output, to the client computing device, the network document.

19. The non-transitory computer-readable medium of claim 18, wherein the one or more instructions further cause the at least one processor to:

receive, from the client computing device, an indication of a selection of a portion of the network document; and output, to the client computing device, an indication of which one of the group of users last edited the portion of the network document.

20. The non-transitory computer-readable medium of claim 16, wherein the one or more instructions further cause the at least one processor to:

prevent at least one client computing device included in the group of client computing devices from modifying the network document, wherein the at least one client computing device is associated with at least one user included in the group of users is assigned to the view-only privilege associated with the network document.

\* \* \* \* \*